(12) United States Patent
Ultsch et al.

(10) Patent No.: US 12,195,611 B2
(45) Date of Patent: Jan. 14, 2025

(54) EXTRUDABLE HALOGEN-FREE, FLAME RETARDANT COMPOSITIONS

(71) Applicant: Dow Global Technologies LLC, Midland, MI (US)

(72) Inventors: Stefan Ultsch, Horgen (CH); Svyatoslav Burmistrov, Moscow (RU)

(73) Assignee: Dow Global Technologies LLC, Midland, MI (US)

( * ) Notice: Subject to any disclaimer, the term of this patent is extended or adjusted under 35 U.S.C. 154(b) by 594 days.

(21) Appl. No.: 17/600,635

(22) PCT Filed: Mar. 26, 2020

(86) PCT No.: PCT/US2020/024893
§ 371 (c)(1),
(2) Date: Oct. 1, 2021

(87) PCT Pub. No.: WO2020/205416
PCT Pub. Date: Oct. 8, 2020

(65) Prior Publication Data
US 2022/0064421 A1    Mar. 3, 2022

Related U.S. Application Data

(60) Provisional application No. 62/828,621, filed on Apr. 3, 2019.

(51) Int. Cl.
*C08L 23/00* (2006.01)
*B32B 7/12* (2006.01)
(Continued)

(52) U.S. Cl.
CPC ............ *C08L 23/0853* (2013.01); *B32B 7/12* (2013.01); *B32B 15/085* (2013.01); *B32B 15/20* (2013.01);
(Continued)

(58) Field of Classification Search
CPC ...... C08L 23/0853; C08L 31/04; C08L 51/06; C08K 2003/265; B32B 15/085;
(Continued)

(56) References Cited

U.S. PATENT DOCUMENTS 4,722,858 A * 2/1988 Harbourne .............. C08L 23/04
524/436
5,498,482 A    3/1996 Buchner
(Continued)

FOREIGN PATENT DOCUMENTS

CN    101463160 A    6/2009
CN    201309292 Y    9/2009
(Continued)

OTHER PUBLICATIONS

DuPont Elvax 210 Ethylene Vinyl Acetate material data sheet. Copyright 1996-2024. (Year: 1996).*
(Continued)

*Primary Examiner* — Rip A Lee
(74) *Attorney, Agent, or Firm* — Dinsmore & Shohl LLP (57) ABSTRACT

The present disclosure provides embodiments of a halogen-free flame retardant composition including one or more polyolefin copolymers having a melt flow index of 350 grams per 10 minutes (g/10 min) to 1000 g/10 min measured at 190 C and 2.16 kg, wherein the one or more polyolefin copolymers comprises maleic anhydride-grafted polyolefin, ethylene-vinyl acetate copolymer, or both; and greater than 83 wt. % of inorganic fillers based on the total weight of the halogen-free flame retardant composition.

16 Claims, 1 Drawing Sheet

(51) Int. Cl.
  *B32B 15/085* (2006.01)
  *B32B 15/20* (2006.01)
  *C08K 3/013* (2018.01)
  *C08L 23/08* (2006.01)
  *C08L 31/04* (2006.01)
  *C08L 51/06* (2006.01)
  *C08K 3/26* (2006.01)

(52) U.S. Cl.
  CPC .............. *C08K 3/013* (2018.01); *C08L 51/06* (2013.01); *B32B 2250/03* (2013.01); *B32B 2250/40* (2013.01); *B32B 2307/3065* (2013.01); *B32B 2607/00* (2013.01); *C08K 2003/265* (2013.01); *C08L 31/04* (2013.01); *C08L 2201/02* (2013.01)

(58) Field of Classification Search
  CPC ......... B32B 15/082; B32B 15/20; B32B 7/12; B32B 2250/40; B32B 2607/00; B32B 2419/00
  See application file for complete search history.

(56) References Cited

U.S. PATENT DOCUMENTS

| | | | |
|---|---|---|---|
| 5,508,082 A | | 4/1996 | Ehrat et al. |
| 6,214,924 B1 | | 4/2001 | Bieser et al. |
| 6,740,180 B1 | * | 5/2004 | Cesaroni ................. C06B 45/10 149/19.91 |
| 7,279,520 B2 | | 10/2007 | Hausmann et al. |
| 7,335,696 B2 | | 2/2008 | Yalvac et al. |
| 8,048,519 B2 | * | 11/2011 | Rolland .................. B32B 15/20 442/136 |
| 9,981,451 B2 | | 5/2018 | Mizrahi et al. |
| 10,053,574 B2 | * | 8/2018 | Brindle, Jr. ............. C08L 91/00 |
| 10,414,912 B2 | * | 9/2019 | Dittmar ............... C08L 23/0853 |
| 11,542,383 B2 | * | 1/2023 | LiPiShan ................. C08K 3/00 |
| 2006/0264549 A1 | * | 11/2006 | Rolland ............. C08L 23/0869 524/556 |
| 2009/0155584 A1 | | 6/2009 | Rolland et al. |
| 2017/0298213 A1 | | 10/2017 | Dittmar et al. |
| 2018/0127564 A1 | | 5/2018 | LiPiShan et al. |
| 2020/0055294 A1 | | 2/2020 | Yoshizaki et al. |

FOREIGN PATENT DOCUMENTS

| | | | | |
|---|---|---|---|---|
| CN | 101870567 A | * | 10/2010 | ............. C04B 26/16 |
| CN | 104912219 A | | 9/2015 | |
| EP | 1882008 B1 | | 4/2010 | |
| JP | 2019059846 A | * | 4/2019 | |
| WO | 2010062113 A2 | | 6/2010 | |
| WO | WO 2016/089543 A1 | * | 6/2016 | .............. C08L 23/08 |
| WO | WO 2016/209754 A1 | * | 12/2016 | .............. C08L 23/06 |
| WO | 2018/203552 A1 | | 11/2018 | |
| WO | 2019005981 A1 | | 1/2019 | |
| WO | 2020/205416 A1 | | 10/2020 | |

OTHER PUBLICATIONS

Arkema Evatane 33-400 Copolymer Ethylene Vinyl Acetate. Copyright 1996-2024. (Year: 1996).*
CN 101870567 A (Oct. 27, 2010); machine translation. (Year: 2010).*
Taiwan Office Action and Search Report dated Jan. 10, 2024, pertaining to TW Patent Application No. 109110399, 13 pgs.
Communication pursuant to Rules 161(1) and 162 EPC, dated Nov. 10, 2021, pertaining to European Patent Application No. 20718120.7.
Brazilian Office Action dated Sep. 11, 2023, pertaining to BR Patent Application No. BR112021018133.4, 8 pgs.
Chinese Office Action dated Oct. 14, 2023, pertaining to CN Patent Application No. 202080020721.2, 11 pgs.
Songhan Plastic Technology, "DuPont(TM) Fusabond P353 Polymer Modifier", Retrieved from the Internet: URL:http://www.lookpolymers.com/pdf/DuPont-Fusabond-P353-Polymer-Modifier.pdf, Retrieved on Apr. 29, 2020.
Mitsubishi, "Mitsubishi Pyrofil Trh5060m", Retrieved from the internet: URL:https://www.900gpa.com/en/product/fiber/CF_007278CE1A?u=metric, Retrieved on Apr. 29, 2020.
International Search Report and Written Opinion issued by the European Patent Office acting as International Searching Authority for International Patent Application No. PCT/US2020/024893 dated Jul. 20, 2020 (18 total pages).
Chinese Office Action and Search Report dated Apr. 14, 2023, pertaining to Chinese Patent Application No. 202080020721.2 16 pages.
Indonesian Office Action pertaining to Patent Application No. P00202109355, dated Apr. 3, 2023 6 pages.
Indian Examination Report dated Jul. 7, 2023, pertaining to Indian Patent Application No. 202117044737, 6 pages.
Chinese Office Action dated Feb. 29, 2024, pertaining to CN Patent Application No. 202080020721.2, 14 pgs.
Japanese Office Action dated Mar. 12, 2024, pertaining to JP Patent Application No. 2021-558625, 6 pgs.
Taiwan Office Action dated Jul. 1, 2024, pertaining to TW Patent Application No. 109110399, 11 pgs.
European Office Action dated May 2, 2024, pertaining to EP Patent Application No. 20718120.7, 9 pgs.

* cited by examiner

EXTRUDABLE HALOGEN-FREE, FLAME RETARDANT COMPOSITIONS

CROSS-REFERENCE TO RELATED APPLICATIONS

This application is a National Stage Entry under 35 U.S.C. § 371 of International Patent Application No. PCT/US2020/024893, filed Mar. 26, 2020, entitled "Extrudable Halogen-Free, Flame Retardant Compositions," which claims priority to U.S. Provisional Patent Application No. 62/828,621, filed on Apr. 3, 2019, the entire disclosures of which are hereby incorporated by reference.

TECHNICAL FIELD

Embodiments described herein generally relate to halogen-free, flame retardant materials and specifically relate to halogen-free, flame retardant materials for use in core layers of aluminum composite panels.

BACKGROUND

Aluminum composite panels are rigid composite designs, which are made from a polymeric core, bonded with adhesive tie layers to aluminum surface sheets.

Common applications of aluminum composite panels are in infrastructure façade systems, visual displays, and transportation. For example, aluminum composite panels may be used for exposed façade systems in high rise buildings.

SUMMARY

Following recent fire incidents in high rise buildings, more stringent fire regulations are being imposed on façade systems of buildings.

Aluminum composite panels and their fire performance and fuel load may be important to the safety of a façade system. Test standards are defined by the fire performance ratings of the core material of the aluminum composite panel. Such ratings may depend on Gross heat of Combustion (which may also be referred to as Calorific Value or pouvoir calorifique superieur (PCS)), fire growth rate (FIGRA), combustibility, and/or total heat release (THR) of the core material. In some incidents, the presence of a non-flame retardant polymer-composite core may allow for a fire to spread over a façade system during a fire incident.

Today producers of aluminum composite panels supply flame retardant panels designed for façade systems, designed to meet Euroclass B or the more stringent Euroclass A2 rating, which specifies limited combustibility of the core materials. As the panels are produced and sold globally, Euroclass A2 is becoming a global requirement.

Currently, core materials fulfilling Euroclass A2 fire safety are processed by sintering on double-band presses, often from slurries of inorganic, non-flammable components in water-based binder systems. However, sintering methods may be relatively slow and expensive, and the sheets may be relatively difficult to handle. Additionally, sintered core materials with high filler levels usually have poor mechanical strength. Moreover, the sintering process may require specific production equipment. On the other hand, conventional, non Euroclass A2 rated composite panels may be produced using sheet extrusion lines. However, extrusion or direct extrusion is difficult or not possible for polyolefin based formulations with inorganic filler content above 83 wt. %. Direct extrusion in this context includes the combination of a compounding process with final shaping into flat sheets in one processing step.

As such, there are needs for compositions that may be extruded in the production of Euroclass A2-rated core materials for aluminum composite panels. Embodiments of the present disclosure meet those needs by providing compositions including one or more polyolefin copolymers having a melt flow index of 350 grams per 10 minutes (g/10 min) to 1000 g/10 min measured at 190° C. and 2.16 kg; and greater than 83 wt. % of inorganic fillers, based on the total weight of the halogen-free flame retardant composition.

It is believed the inclusion of greater than 83 wt. % inorganic fillers allows for the Euroclass A2-rating to be met, meaning the PCS of the formulation according to EN ISO 1716 is below 3 MJ/kg. At 83 wt. % or higher filler levels, the polymeric backbones of the disclosed compositions may allow for extrudable compositions, which may be utilized as the core layers in economic and efficient manufacturing processes of aluminum composite panels. Moreover, embodiments of the present disclosure may allow for improved mechanical strength and flexibility when compared with conventional, sintered Euroclass A2-rated compositions.

According to at least one embodiment of the present disclosure, a halogen-free flame retardant composition is provided. Embodiments of the halogen-free flame retardant composition may include one or more polyolefin copolymers having a melt flow index of 350 grams per 10 minutes (g/10 min) to 1000 g/10 min measured at 190° C. and 2.16 kg, wherein the one or more polyolefin copolymers comprise maleic anhydride-grafted polyolefin, ethylene-vinyl acetate copolymer, and greater than 83 wt. % of inorganic fillers comprising one or more of talc, $CaCO_3$, magnesium hydroxide, aluminum trihydrate, silicon dioxide, siloxanes, or mica based on the total weight of the halogen-free flame retardant composition.

According to at least one embodiment of the present disclosure, a composite panel is provided. Embodiments of the composite panels may include a first metal layer; a second metal layer; a core layer disposed between the first metal layer and the second metal layer, a first tie layer disposed between the first metal layer and the core layer; and a second tie layer disposed between the second metal layer and the core layer; and wherein the core layer comprises the halogen-free flame retardant composition described herein.

According to at least one embodiment of the present disclosure, a method of fabricating a composite panel is provided. Embodiments of the method may include extruding a core layer; applying a first tie layer and a second tie layer on opposite surfaces of the core layer; and laminating a first metal layer and a second metal layer on the first tie layer and second tie layer, respectively, after application onto the core layer, in order to produce the composite panel; wherein the core layer comprises the halogen-free flame retardant composition described herein.

These and other embodiments are described in more detail in the following Detailed Description.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Specific embodiments of the present application will now be described. These embodiments are provided so that this disclosure will be thorough and complete and will fully convey the scope of the subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

As used herein "polyolefin" or "olefin-based polymer" may include ethylene-based polymers and propylene-based polymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

"Polypropylene" or "propylene based polymer" shall mean polymers comprising greater than 50% by mole of units derived from propylene monomer. This includes propylene-based homopolymers or copolymers (meaning units derived from two or more comonomers). Common forms of ethylene-based polymers known in the art include, but are not limited to, impact polypropylene copolymers icPP, random copolymers rcPP, polypropylene homopolymers hPP, ethylene-propylene copolymers (POE Plastomers), polypropylene reactor blends.

Reference will now be made in detail to embodiments of halogen-free flame retardant compositions as described herein. Embodiments of the halogen-free flame retardant composition may include one or more polyolefin copolymers having a melt flow index of 350 grams per 10 minutes (g/10 min) to 1000 g/10 min measured at 190° C. and 2.16 kg, wherein the one or more polyolefin copolymers comprise maleic anhydride-grafted polyolefin, ethylene-vinyl acetate copolymer, or blends thereof; and greater than 83 wt. % of inorganic fillers, which may include one or more of talc, $CaCO_3$, magnesium hydroxide, aluminum trihydrate, silicon dioxide, or mica based on the total weight of the halogen-free flame retardant composition.

In embodiments, the halogen-free flame retardant compositions described herein may include one or more polyolefin copolymers. In some embodiments, the halogen-free flame retardant compositions may include less than 17 wt. % of the one or more copolymers, based on the total weight of the halogen-free flame retardant composition. In other embodiments, the halogen-free flame retardant compositions may include from about 10 wt. % to about 17 wt. %; from about 10 wt. % to about 15 wt. %; from about 10 wt. % to about 13 wt. %; from about 10 wt. % to about 11 wt. %; from about 11 wt. % to about 17 wt. %; from about 11 wt. % to about 15 wt. %; from about 11 wt. % to about 13 wt. %; from about 13 wt. % to about 17 wt. %; from about 13 wt. % to about 15 wt. %; or from about 15 wt. % to about 17 wt. % of the one or more copolymers.

In embodiments, the one or more polyolefin copolymers may include an ethylene-vinyl acetate copolymer, a maleic anhydride-grafted polymer, a maleic anhydride copolymer, ethylene-acrylic or ethylene-methacrylic acid copolymers, or copolymers of ethylene (ethyl-, methyl-, butyl-) acrylate, or combinations thereof.

In embodiments, the halogen-free flame retardant compositions described herein may include one or more polyolefin copolymers. In some embodiments, the one or more polyolefin copolymers may include a maleic anhydride-grafted polyolefin.

In embodiments, the maleic anhydride-grafted polyolefin may be an ethylene-based polymer with a maleic anhydride grafting monomer grafted thereto. Suitable ethylene-based polymers for the maleic anhydride-grafted polyolefin include, without limitation, polyethylene homopolymers and copolymers with α-olefins, copolymers of ethylene and vinyl acetate, and copolymers of ethylene and one or more alkyl (meth)acrylates. In specific embodiments, the maleic anhydride-grafted polyolefin may comprise one or more of a maleic anhydride-grafted linear low density polyethylene (LLDPE), a maleic anhydride-grafted polyethylene elastomer, or a combination thereof.

In embodiments, the maleic anhydride-grafted polyolefin may be a propylene-based polymer with a maleic anhydride grafting monomer grafted thereto. Suitable propylene-based polymers for the maleic anhydride-grafted polyolefin include, without limitation, propylene homopolymers and copolymers with α-olefins, copolymers of ethylene and vinyl acetate, and copolymers of ethylene and one or more alkyl (meth)acrylates. In specific embodiments, the maleic anhydride-grafted polyolefin may comprise one or more of a maleic anhydride-grafted polypropylene, a maleic anhydride-grafted polypropylene-ethylene plastomer, or a combination thereof.

When the ethylene-based polymer is a polyethylene homopolymer or a copolymer of ethylene with one of more α-olefins, the ethylene-based polymer may be linear or substantially linear. Suitable α-olefin comonomers, which may be either aliphatic or aromatic, may include C3-C20 α-olefins, C3-C16 α-olefins, or C3-C10 α-olefins. In one or more embodiments, the α-olefin may be a C3-C10 aliphatic α-olefin selected from the group consisting of propylene, 1-butene, 1-hexene and 1-octene. In embodiments, the α-olefin is propylene.

Without being bound by theory, it is believed that the maleic anhydride-grafted polyolefin may interact with the inorganic fillers to provide halogen-free flame retardant compositions with improved mechanical properties and improved fire performance as dripping may be reduced.

In one or more embodiments, the maleic anhydride-grafted polyolefin comprises from about 0.1 wt. % to about 10 wt. % from about 0.1 wt. % to about 5 wt. %, from 0.5 wt. % to wt. %, from about 0.1 wt. % to about 1.8 wt. %, or from about 0.1 wt. % to about 0.5 wt. % of the maleic anhydride grafting monomer, based on the total weight of the maleic anhydride-grafted polyolefin. The weight percentage of the ethylene-based polymer is complementary to the amount of maleic anhydride grafting monomer, so that the sum of the weight percentages of the ethylene-based polymer and the maleic anhydride-grafted monomer is 100 wt. %. Thus, the maleic anhydride-grafted polyolefin comprises up to 90 wt. %, up to 95 wt. %, or from 96 to 99 wt. %, based on the total weight of the maleic anhydride-grafted polyolefin, of the ethylene-based polymer.

In one or more embodiments, the maleic anhydride-grafted polyolefin may have a melt index ($I_2$) of about 350 to about 1000 grams per 10 minutes (g/10 min), or from about 400 g/10 min to about 800 g/10 min, from about 400 g/10 min to about 600 g/10 min, about 500 to about 1000 grams per 10 minutes (g/10 min), or from about 500 g/10 min to about 800 g/10 min, from about 500 g/10 min to about 600 g/10 min, from about 600 g/10 min to about 1000 g/10 min, from about 600 g/10 min to about 800 g/10 min, or from about 800 g/10 min to about 1000 g/10 min as determined in accordance with ASTM method D1238 at 190° C. and 2.16 kg.

In further embodiments, the maleic anhydride-grafted polyolefin has a density of less than about 0.910 grams per cubic centimeter (g/cc), from about 0.860 g/cc to about 0.910 g/cc, from about 0.860 g/cc to about 0.900 g/cc, from about 0.860 g/cc to about 0.890 g/cc, from about 0.860 g/cc to about 0.880 g/cc, from about 0.860 g/cc to about 0.870 g/cc, from about 0.870 g/cc to about 0.910 g/cc, from about 0.870 g/cc to about 0.900 g/cc, from about 0.870 g/cc to about 0.890 g/cc, from about 0.870 g/cc to about 0.880 g/cc, from about 0.880 g/cc to about 0.910 g/cc, from about 0.880 g/cc to about 0.900 g/cc, from about 0.880 g/cc to about 0.890 g/cc, from about 0.890 g/cc to about 0.910 g/cc, from about 0.890 g/cc to about 0.900 g/cc, for rom about 0.900 g/cc to about 0.910 g/cc. In embodiments, the maleic anhydride-grafted polyolefin may be a maleic anhydride-grafted polyolefin elastomer with a Brookfield viscosity greater than 8,000 cP or from about 8,000 cP to about 20,000 cP, when measured at 177° C.

Various commercial embodiments are considered suitable. For example, suitable maleic anhydride-grafted polyolefin may be commercially available from The Dow Chemical Company under, for example, the trademark AFFINITY™ GA 1000R and FUSABOND™ P353D.

Various amounts of the maleic anhydride-grafted polyolefin are contemplated as suitable within the halogen-free flame retardant compositions. In embodiments, the halogen-free flame retardant composition may include from 17 wt. % or less maleic anhydride-grafted polyolefin, based on the total weight of the halogen-free flame retardant composition. In other embodiments, the halogen-free flame retardant composition may include from about 5 wt. % to about 15 wt. %, from about 5 wt. % to about 10 wt. %, from about 10 wt. % to about 15 wt. %, or from about 10 wt. % to about 17 wt. % maleic anhydride-grafted polyolefin, based on the total weight of the halogen-free flame retardant composition.

As stated previously, in embodiments, the halogen-free flame retardant compositions described herein may include one or more polyolefin copolymers. In embodiments, the halogen-free flame retardant compositions described herein may include an ethylene-vinyl acetate copolymer (EVA). The ethylene-vinyl acetate copolymer is an ethylene-based polymer including ethylene and vinyl acetate. In embodiments, the ethylene-vinyl acetate copolymer may include from about 20 wt. % to about 90 wt. % of ethylene and from about 10 wt. % to about 80 wt. % of vinyl acetate, based on the total weight of the ethylene-vinyl acetate copolymer. In other embodiments, the ethylene-vinyl acetate copolymer may include from about 20 wt. % to about 80% wt. %, from about 20 wt. % to about 60 wt. %, from about 20 wt. % to about 40 wt. %, from about 20 wt. % to about 30 wt. %, from about 20 wt. % to about 25 wt. %, from about 25 wt. % to about 90 wt. %, from about 25 wt. % to about 80 wt. %, from about 25 wt. % to about 60 wt. %, from about 25 wt. % to about 40 wt. %, or from about 25 wt. % to about 30 wt. % of ethylene based on the total weight of the ethylene-vinyl acetate copolymer.

In other embodiments, the one or more polyolefin copolymers may be ethylene-based and include acrylate- or methacrylate groups. In embodiments, the one or more polyolefin copolymers may include ethylene-acrylic or ethylene-methacrylic acid copolymers, copolymers of ethylene (ethyl-, methyl-, butyl-), acrylate, or combinations thereof. These copolymers are in embodiments, the copolymer may include from about 20 wt. % to about 90 wt. % of ethylene and from about 10 wt. % to about 80 wt. % of the co-polymerized functionalities. In other embodiments, the copolymers may include from about 20 wt. % to about 80% wt. %, from about 20 wt. % to about 60 wt. %, from about 20 wt. % to about 40 wt. %, from about 20 wt. % to about 30 wt. %, from about 20 wt. % to about 25 wt. %, from about 25 wt. % to about 90 wt. %, from about 25 wt. % to about 80% wt. %, from about 25 wt. % to about 60 wt. %, from about 25 wt. % to about 40 wt. %, or from about 25 wt. % to about 30 wt. % of ethylene based on the total weight of the copolymer.

By the nature of their chemical compositions it is believed that the ethylene-vinyl acetate co-polymers and other co-polymers have a lower calorific value (PCS) in comparison with polyethylene homopolymers. Therefore, the ethylene-vinyl acetate co-polymers and other co-polymers are believed to have a reduced contribution to the calorific value in the halogen-free flame retardant compositions described herein. This may allow for embodiments of the halogen-free flame retardant compositions to include higher fractions of the one or more polyolefin copolymers, which provides improved processability.

In one or more embodiments, the ethylene-vinyl acetate copolymer may have a melt index ($I_2$) of about 350 to about 1000 grams per 10 minutes (g/10 min), about 400 to about 1000 g/10 min, from about 500 g/10 min to about 1000 g/10 min, from about 500 g/10 min to about 800 g/10 min, from about 500 g/10 min to about 600 g/10 min, from about 600 g/10 min to about 1000 g/10 min, from about 600 g/10 min to about 800 g/10 min, or from about 800 g/10 min to about 1000 g/10 min as determined in accordance with ASTM method D1238 at 190° C. and 2.16 kg.

In further embodiments, the ethylene-vinyl acetate copolymer has a density less than about 0.955 grams per cubic centimeter (g/cc), or from about 0.860 to about 0.955 g/cc, as measured according to ASTM Method No. D792-91. Other density ranges may be from about 0.870 to about 0.950 g/cc, or from about 0.875 to about 0.950 g/cc.

Various commercial embodiments are considered suitable. For example, suitable ethylene-vinyl acetate copolymers may be commercially available from E. I. du Pont de Nemours and Company under the trademark ELVAX™. In further embodiments, suitable ethylene-vinyl acetate copolymers may be commercially available from E. I. du Pont de Nemours and Company under the trademark ELVAX™ 210W.

Various amounts of the ethylene-vinyl acetate copolymer are contemplated as suitable within the halogen-free flame retardant compositions. In embodiments, the halogen-free flame retardant composition may include from 17 wt. % or less ethylene-vinyl acetate copolymer, based on the total weight of the halogen-free flame retardant composition. In other embodiments, the halogen-free flame retardant composition may include from about 5 wt. % to about 15 wt. %, from about 5 wt. % to about 10 wt. %, from about 10 wt. % to about 15 wt. %, from about 10 wt. % to about 17 wt. % ethylene-vinyl acetate copolymer, based on the total weight of the halogen-free flame retardant composition.

In embodiments, the halogen-free flame retardant compositions described herein may include various filler materials, which may be collectively referred to herein as "fillers." The filler materials may include inorganic fillers. Inorganic fillers may include $CaCO_3$, BaSO4, CaSO4, silicates, talc, kaolin, clay, mica, silicon dioxide, inorganic flame retardants, and combinations thereof. Inorganic flame retardants may include Aluminum trihydrate, Aluminum oxide, Magnesium hydroxide, Huntites, Boehmites and their co-agents. In embodiments, intumescent flame retardants may be utilized, which include calcinated clay, graphene and polyphosphonates. The filler materials may include radical scavenger flame retardants, including phosphonates, phosphites, melamine or hindered amines. In further embodiments, the inorganic fillers may be anhydrous inorganic fillers or at least a majority anhydrous inorganic fillers (by weight).

In some embodiments, the fillers may include from about 51 wt. % to about 100 wt. %, from about 51 wt. % to about 80 wt. %, from about 51 wt. % to about 60 wt. %, from about 60 wt. % to about 100 wt. %, from about 60 wt. % to about 80 wt. %, or from about 80 wt. % to about 100 wt. % anhydrous inorganic filler, based on the total weight of the fillers in the halogen-free flame retardant composition.

Without being bound by theory, it is believed that the fire retardancy of the fillers may depend on the amount of water released by the filler. In some embodiments, the filler content may include a majority of anhydrous inorganic filler, which releases relatively less water. In general, as water is released, this contributes to fire safety as the generated vapor reduces temperatures and retards combustion. In the case of aluminum composite panels, water vapor release may cause delamination of the composite panels and generate structural problems leading to fire incidents. The selection of the filler and flame retardant package may be dependent on the final product design.

Filler selection may be influenced by the particle size and particle size distribution of the fillers, which may affect processing, physical properties and fire performance of the halogen-free flame retardant compositions. Decreasing particle size may increase the melt viscosities and deteriorate processing, yet improve tear resistance, tensile strength and break elongation. For water-releasing flame retardants, the burning behavior may be improved by a more uniform water release. In cases were burning droplets are an issue, finer particles may have reduced dripping behavior and therefore improve the fire performance.

Filler selection may be influenced by surface coatings and surface shapes. Surface coatings, including, but are not limited to, silanes, polyolefin waxes and calcium-stearate, may improve the processing behavior of the fillers by acting as internal or external lubricants, which may reduce the viscosity. However, organic surface coatings may deteriorate the fire performance of the fillers because they may contribute to the fuel load. Functional filler coatings may interact with functional groups of the polymers or the polymers themselves and thus improve physical properties as well as fire performance in terms of dripping. Without being bound by theory, it is believed that a spherical morphology, as compared to plates or flakes, may not increase the viscosity of the core filler composition. Spherical structures may act as processing aids, like for example specific silicon dioxide, while coarse and ground fillers may deteriorate the processing behavior.

The halogen-free flame retardant compositions described herein may include greater than 83 wt. % fillers, based on the total weight of the halogen-free flame retardant composition. In other embodiments, the halogen-free flame retardant compositions may include from about 83 wt. % to about 91 wt. %, from about 83 wt. % to about 89 wt. %, from about 83 wt. % to about 88 wt. %, from about 83 wt. % to about 87 wt. %, from about 83 wt. % to about 86 wt. %, from about 83 wt. % to about 85 wt. %, from about 83 wt. % to about 84 wt. %, from about 85 wt. % to about 90 wt. %, from about 85 wt. % to about 89 wt. %, from about 85 wt. % to about 88 wt. %, from about 85 wt. % to about 87 wt. %, from about 85 wt. % to about 86 wt. %, from about 86 wt. % to about 90 wt. %, from about 86 wt. % to about 89 wt. %, from about 86 wt. % to about 88 wt. %, from about 86 wt. % to about 87 wt. %, from about 87 wt. % to about 90 wt. %, from about 87 wt. % to about 89 wt. %, from about 87 wt. % to about 88 wt. %, from about 88 wt. % to about 90 wt. %, from about 88 wt. % to about 89 wt. %, or from about 89 wt. % to about 90 wt. % fillers, based on the total weight of the halogen-free flame retardant composition.

The halogen-free flame retardant compositions described herein may include an internal inorganic lubricant. In some embodiments, the inorganic internal lubricant may include organo-siloxanes and amorphous silicon dioxide. Without being bound by theory, the internal inorganic lubricant may allow for improved dispersion of the components in the halogen-free flame retardant composition, which may allow for relatively better flow, allowing higher extrusion speeds and smoother surface of the end product. Examples of an inorganic internal lubricant may include, but are not limited to, Sidistar T120U silicon dioxide, supplied by Elkem Silicon Materials or Siloxane SFD-5 from the Dow Chemical Company.

In one or more embodiments, the halogen-free flame retardant compositions described herein may have properties that allow for it to achieve a Euroclass A2 fire rating.

Moreover, the halogen-free flame retardant compositions described herein may have a fuel load (which may also be referred to as a gross calorific potential (PCS)) of less than 3 MJ/kg when measured according to EN ISO 1716, as described subsequently in the test methods section of this disclosure. In other embodiments, the halogen-free flame retardant compositions described herein may have a fuel load or gross calorific potential (PCS) of less than 2.5 MJ/kg or less than 2.0 when measured according to EN ISO 1716.

Further, the halogen-free flame retardant compositions described herein may have a combustibility rating that meets Euroclass A2 requirements when measured according to EN ISO 1182, as described subsequently in the test methods section of this disclosure. The quantities used in the European classification are the temperature rise of the furnace ($\Delta T$), the mass loss of the specimen ($\Delta m$), and the time of sustained flaming of the specimen ($t_f$). To meet Euroclass A2 requirements, the halogen-free flame retardant compositions described herein may have a $\Delta T$ (temperature) of less than or equal to about 50° C.; a Δm (mass) of less than or about equal to 50%; and a tf (burning time) of less than 20 s.

The halogen-free flame retardant compositions described herein may also have a total heat release that meets Euroclass A2 requirements when measured according to EN ISO 13823, as described subsequently in the test methods section of this disclosure. The classification parameters of EN ISO 13823 include fire growth rate index (FIGRA), measured in (W/s); lateral flame spread (LFS); total heat release (THR$_{600s}$); smoke growth rate index (SMOGRA), measured in (m$^2$/s$^2$); total smoke production (TSP$_{600s}$); for flaming droplets and particles according to their occurrence during the first 600 seconds (s) of the test. To meet Euroclass A2 requirements, the halogen-free flame retardant compositions described herein may have a FIGRA of less than or about equal to 120 W/s, a LFS of less than the edge of the specimen, and a THS$_{600s}$ of less than or about equal to 7.5 MJ.

According to embodiments of the present disclosure, a composite panel is provided, which includes embodiments of the halogen-free flame retardant compositions described herein.

Figure 1:
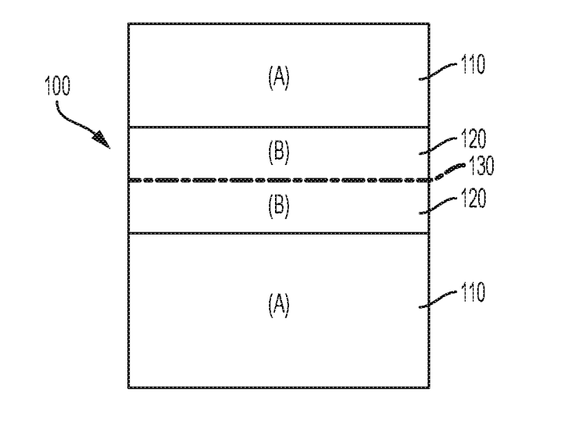
FIG. 1 is a schematic depiction of an embodiment of a composite panel, according to the embodiments described herein.

Referring now to the embodiment of FIG. 1, the composite panel (100) may include a first metal layer (110); a second metal layer (110), a core layer (130) disposed between the first metal layer (110) and the second metal layer (110), a first tie layer (120) disposed between the first metal layer (110) and the core layer (130); and a second tie layer (120) disposed between the second metal layer (110) and the core layer (130).

In embodiments, the first metal layer (100), the second metal layer (200), or both may include aluminum, stainless steel, painted steel, titanium, copper, zinc, or combinations thereof. In embodiments, the first metal layer, the second metal layer, or both may have a width of from about 0.2 mm to about 0.5 mm. In other embodiments, the first metal layer, the second metal layer, or both may have a width from about 0.2 mm to about 0.4 mm, from about 0.2 mm to about 0.3 mm, from about 0.3 mm to about 0.5 mm, from about 0.3 mm to about 0.4 mm, or from about 0.4 to about 0.5 mm.

In embodiments, the adhesive tie layers may include one or more adhesive resins. In embodiments, the adhesive tie layers may include MAH-grafted polyolefin homo- or interpolymers. Based on the manufacturing of the metal composite panels, the adhesive tie layers may be co-extruded or applied via film lamination. Depending on the manufacturing process and the final product requirements, the adhesive tie layers may be based on low-crystalline polyolefin elastomers or have a relatively more crystalline linear-low density polyethylene structure. Depending on the fire performance requirements, the adhesive tie layers may be compounded with inorganic fillers or flame retardants. Various commercial embodiments are considered suitable for the adhesive tie layers. For example, suitable adhesive resins that may be utilized as the first and second tie layers may be commercially available from The Dow Chemical Company E. I. du Pont de Nemours and Company under the trademark Bynel®, Lucalen A 2920 M from LyondellBasell, and Lushan from Guangzhou Lushan New Materials Co., Ltd.

In one or more embodiments, the first adhesive tie layer, the second adhesive tie layer, or both may have a thickness of about 20 μm to about 100 μm. In other embodiments, the first adhesive tie layer, the second adhesive tie layer, or both may have a width of from about 20 μm to about 90 μm, from about 20 μm to about 80 μm, from about 20 μm to about 60 μm, from about 20 μm to about 40 μm, from about 30 μm to about 100 μm, 30 μm to about 80 μm, from about 30 μm to about 60 μm, from about 30 μm to about 40 μm, from about 40 μm to about 100 μm, from about 40 μm to about 80 μm, from about 40 μm to about 60 μm, from about 60 μm to about 100 μm, from about 60 μm to about 80 μm, or from about 80 μm to about 100 μm.

In embodiments, the core layer (300) may comprise embodiments of the halogen-free flame retardant compositions described herein. In embodiments, the core layer may have a width of from about 1 mm to about 5 mm. In other embodiments, the core layer may have a width of from about 2 mm to about 4 mm, from about 2 mm to about 3 mm, from about 3 mm to about 5 mm, from about 3 mm to about 4 mm, or from about 4 mm to about 5 mm.

In embodiments, the composite panel described herein may achieve a Euroclass A2 fire rating based on the properties of the core layer (130).

Methods of producing embodiments of the composite panels comprising the halogen-free flame retardant compositions described herein may include extrusion of the core layer. It is believed that by providing an extrudable core layer material, including embodiments of the halogen-free flame retardant compositions described herein, may allow for economic and simplistic processes for the production of composite panels, which still meet Euroclass A2 fire ratings.

In embodiments, the composite panels may be produced by extruding embodiments of the halogen-free flame retardant compositions described herein through a flat slit die and shaping the compositions in a rolling press to form the core layer (130) and fabricate final dimensions. The core layer (130) may then be fed in-line to a lamination step, or could be rolled for later processing. In further embodiments, methods of producing the composite panels may include coextruding the first tie layer (120) and the second tie layer (120) onto the core layer (130). In other embodiments, methods of producing the composite panels may include laminating the first tie layer (120) and the second tie layer (120) onto the core layer (130). In embodiments, methods of producing the composite panels may include in-line lamination of the first metal layer (110) and the second metal layer (110) onto the first tie layer (120) and the second tie layer (120), thereby producing the composite panel (100).

In further embodiments, the halogen-free flame retardant compositions utilized for the core layer (130) may include one or more pre-compounding steps. Without being bound by theory, the one or more pre-compounding steps may improve processability and conformity of the polyolefin base for direct extrusion of the core layer (100). During the direct extrusion, additional fillers may be fed by side feeders to the molten pre-compounds (or "pre-batches") of the halogen-free flame retardant compositions, which may allowed for more processes for the production of composite panels.

Test Methods

The test methods as used herein include the following:
Euroclass System Standards The Euroclass system is a standards setting body that publishes specifications, test protocols and guidelines for testing the fire resistance of building elements. In the Euroclass system, building products are divided to seven classes on the basis of their reaction-to-fire properties. The test methods and classification criteria are summarized subsequently in Table 1 for construction products (excluding floorings).

TABLE 1

Euroclass system classes of reaction to fire performance for construction products (excluding floorings).

| Class | Test method(s) | Classification criteria | Additional classification |
|---|---|---|---|
| A | EN ISO 1182 | $\Delta T \leq 30°$ C.; and $\Delta m \leq 50\%$; and $t_f = 0$ (i.e. no sustained flaming) | — |
| | EN ISO 1716 | PCS $\leq$ 2.0 MJ kg$^{-1}$ ($^1$); and PCS $\leq$ 2.0 MJ kg$^{-1}$ ($^2$) ($^{2a}$); and PCS $\leq$ 1.4 MJ m$^{-2}$ ($^3$); and PCS $\leq$ 2.0 MJ kg$^{-1}$ ($^4$) | |
| A2 | EN ISO 1182 | $\Delta T \leq 50°$ C.; and $\Delta m \leq 50\%$; and $t_f = 20$ s | Smoke production ($^5$); and flaming droplets/particles ($^6$) |
| | EN ISO 1716 | PCS $\leq$ 3.0 MJ kg$^{-1}$ ($^1$); and PCS $\leq$ 4.0 MJ m$^{-2}$ ($^2$); and PCS $\leq$ 4.0 MJ m$^{-2}$ ($^3$); and PCS $\leq$ 3.0 MJ kg$^{-1}$ ($^4$) | |
| | EN 13823 (SBI) | FIGRA $\leq$ 120 W · s$^{-1}$; and LFS < edge of specimen; and THR$_{600s}$ $\leq$ 7.5 MJ | |
| B | EN 13823 (SBI) | FIGRA $\leq$ 120 W · s$^{-1}$; and LFS < edge of specimen; and THR$_{600s}$ $\leq$ 7.5 MJ | Smoke production ($^5$); and flaming droplets/particles ($^6$) |
| | EN ISO 11925-2 | Fs $\leq$ 150 mm within 60 s | |
| C | EN 13823 (SBI) | FIGRA $\leq$ 250 W · s$^{-1}$; and LFS < edge of specimen; and THR$_{600s}$ $\leq$ 15 MJ | Smoke production ($^5$); and flaming droplets/particles ($^6$) |
| | EN ISO 11925-2 | Fs $\leq$ 150 mm within 60 s | |
| D | EN 13823 (SBI) | FIGRA $\leq$ 750 W · s$^{-1}$ | Smoke production ($^3$); and flaming droplets/particles ($^6$) |
| | EN ISO 11925-2 | Fs $\leq$ 150 mm within 60 s | |
| E | EN ISO 11925-2 | Fs $\leq$ 150 mm within 20 s | Flaming droplets/particles ($^7$) |
| F | | No performance determined | |

($^1$) For homogeneous products and substantial components of non-homogeneous products.
($^2$) For any external non-substantial component of non-homogeneous products.
($^{2a}$) Alternatively, any external non-substantial component having a PCS $\leq$ 2.0 MJ/m$^2$, provided that the product satisfies the following criterial of EN 13823(SBI): FIGRA $\leq$ 20 W · s$^{-1}$; and LFS < edge of specimen; and THR$_{600s}$ $\leq$ 4.0 MJ; and s1 and d0.
($^3$) For any internal non-substantial component of non-homogeneous products.
($^4$) For the product as a whole.
($^5$) s1 = SMOGRA $\leq$ 30 m$^2$ · s$^{-2}$ and TSP$_{600s}$ $\leq$ 50 m$^2$; s2 = SMOGRA $\leq$ 180 m$^2$ · s$^{-2}$ and TSP$_{600s}$ $\leq$ 200 m$^2$; s3 = not s1 or s2.
($^6$) d0 = No flaming droplets/particles in EN 13823(SBI) within 600 s; d1 = No flaming droplets/particles persisting longer than 10 s in EN 13823 (SBI) within 600 s; d2 = not d0 or d1; ignition of the paper in EN ISO 11925-2 results in a d2 classification.
($^7$) Pass = no ignition of the paper (no classification); Fail = ignition of the paper (d2 classification).
($^8$) Under conditions of surface flame attack and, if appropriate to the end-use application, edge flame attack.

Non-Combustibility Test—EN ISO 1182

The purpose of the non-combustibility test EN ISO 1182 is to identify the products that may not contribute to a fire. To perform EN ISO 1182, a test specimen of cylindrical shape is inserted into a vertical tube furnace with a temperature of about 750° C. Temperature changes due to the possible burning of the specimen are monitored with thermocouples. The flaming time of the specimen is visually observed. After the test, the mass loss of the specimen is determined.

The quantities used in the European classification are the temperature rise of the furnace ($\Delta T$), the mass loss of the specimen ($\Delta m$), and the time of sustained flaming of the specimen ($t_f$).

Gross Calorific Potential Test—EN ISO 1716

The gross calorific potential (PCS) test EN ISO 1716 may be used to determine a product's potential maximum total heat release (measured in MJ/kg or MJ/m$^2$) when burned completely. For EN ISO 1716, a powdery test specimen is ignited in pressurized oxygen atmosphere inside a closed steel cylinder (calorimetric bomb) surrounded by water jacket, and the temperature rise of water during burning is measured. Then, the gross calorific potential may be calculated based on the temperature rise, specimen mass, and correction factors.

Single Burning Item Test—EN 13823

The single burning item (SBI) EN 13823 test may be used to simulate a single burning item. For EN 13823, test specimens are installed on a specimen holder with two vertical wings made of non-combustible board. The specimen holder wings of sizes 1.0 m×1.5 m and 0.5 m×1.5 m form a right-angled corner configuration. Depending on the final application and use of the tested material, the specimens may be tested on substrates, or as stand-alone products. The thermal exposure on the surface of the specimen is produced by a right-angled triangle-shaped propane gas burner placed at the bottom corner formed by the specimen wings. The heat output of the burner is 30 kW resulting in a maximum heat exposure of about 40 kW/m$^2$ on an area of approximately 300 cm$^2$. The burner simulates a single burning item. Combustion gases generated during a test are collected by a hood and drawn to an exhaust duct equipped with sensors to measure the temperature, light attenuation, O$_2$ and CO$_2$ mole fractions and flow-induced pressure difference in the duct.

The performance of the specimen is evaluated for an exposure period of 20 minutes. During the test, the heat release rate (HRR) is measured by using oxygen consumption calorimetry. The smoke production rate (SPR) is measured in the exhaust duct based on the attenuation of light. Falling of flaming droplets or particles is visually observed during the first 600 seconds (s) of the heat exposure on the specimen. In addition, lateral flame spread is observed to determine whether the flame front reaches the outer edge of the larger specimen wing at any height between 500 millimeters (mm) and 1000 mm during the test.

The classification parameters of the SBI test are fire growth rate index (FIGRA) (W/s), lateral flame spread (LFS), and total heat release ($THR_{600s}$). Additional classification parameters are defined for smoke production as smoke growth rate index (SMOGRA) ($m^2/s^2$) and total smoke production ($TSP_{600s}$), and for flaming droplets and particles according to their occurrence during the first 600 seconds (s) of the test.

The FIGRA and SMOGRA indices are calculated as follows:

$$FIGRA = 1000 * \max\left(\frac{HRR_{av}(t)}{t}\right) \quad (1)$$

$$SMOGRA = 10000 * \max\left(\frac{SPR_{av}(t)}{t}\right) \quad (2)$$

where HRRav is the heat release rate averaged over 30 seconds (in kW), SPRav is the smoke production rate averaged over 60 seconds (in $m^2/s$), and t is the time elapsed after the beginning of the test (in s), i.e. the ignition of the burner. Constant coefficients are added to the definition of the parameters to obtain convenient ranges of numbers. Different heat release related threshold values for the FIGRA calculation are used in different classes to obtain $FIGRA_{0.2MJ}$ and $FIGRA_{0.4MJ}$ values. Also SMOGRA calculation includes certain smoke production related threshold values, common to all smoke production classes.

The $THR_{600s}$ and $TSP_{600s}$ values are calculated over the first 600 seconds of the test as follows:

$$THR_{600s} = \frac{1}{1000} * \sum_{0s}^{600s} HRR(t) * \Delta t \quad (3)$$

$$TSP_{600s} = \sum_{0s}^{600s} SPR(t) * \Delta t \quad (4)$$

where HRR(t) and SPR(t) are the heat release rate and smoke production rate as functions of time (in kW and $m^2/s$, respectively), and $\Delta t$ is the data acquisition interval of the measurement (in s). The units of $THR_{600s}$ and $TSP_{600s}$ are MJ and $m^2$, respectively.

Ignitability Test—EN ISO 11925-2

The ignitability test EN ISO 11925-2 may be used to test the direct impingement of a small flame on a specimen. During EN ISO 11925-2, the test specimen of size 250 mm×90 mm is attached vertically on a U shaped specimen holder. A propane gas flame with a height of 20 mm is brought into contact with the specimen at an angle of 45°. The application point is either 40 mm above the bottom edge of the surface centerline (surface exposure) or at the center of the width of the bottom edge (edge exposure). Filter paper is placed beneath the specimen holder to monitor the falling of flaming debris.

Two different flame application times and test durations are used depending on the class of the product. For class E, the flame application time is 15 seconds, and the test is terminated 20 seconds after the removal of the flame. With a flame application time of 30 seconds for classes B, C and D, the maximum duration of the test is 60 seconds after the removal of the flame. As shown previously in Table 1, EN ISO 11925-2 is not a test method used specifically to determine a Euroclass A2 rating, but the EN ISO 11925-2 test may be mandatory for building products according to the Euroclass fire rating system, including the metal-composite panels disclosed herein.

The classification criteria are based on observations whether the flame spread (Fs) reaches 150 mm within 60 s of the application of the flame and whether the filter paper below the specimen ignites due to flaming debris. In addition, the occurrence and duration of flaming and glowing are observed.

Melt Index ($I_2$)

To test the melt index ($I_2$), ethylene-based polymer samples are measured according to ASTM D1238 at 190° C. at 2.16 kg. The values are reported in g/10 min, which corresponds to grams eluted per 10 minutes.

Density

To test the density, samples are prepared and measured according to ASTM D4703 and reported in grams/cubic centimeter (g/cc or $g/cm^3$). Measurements are made within one hour of sample pressing using ASTM D792, Method B.

EXAMPLES

The following examples illustrate features of the present disclosure but are not intended to limit the scope of the disclosure. The following experiments analyzed the performance of embodiments of halogen-free flame retardant compositions described herein.

The materials used to produce the Examples described below included ELVAX™ 210 W, sourced from E. I. du Pont de Nemours and Company, as a polymer carrier; AFFINITY™ GA 1000 R, sourced from The Dow Chemical Company, Midland, MI, as a polymer carrier, FUSABOND™ P353, sourced from the Dow Chemical Company, Midland, MI as a polymer carrier. Sidistar T120U, sourced from Elkem, as an amorphous silicon dioxide processing aid; Kenreact LICA 38, sourced from Kenrich, as a titanate-based processing aid; Imerys 15 and MW-100, sourced from Imerys Carbonates, are coarse calcium carbonate fillers; Omyacarb 10-AV as a coarse calcium carbonate filler, Omyamaxx, sourced from Omya, as a coated calcium carbonate filler; Hidromag Q3005, sourced from Chimica del Rey, as a magnesium hydroxide flame retardant and filler; ADEKA FLAMESTAB FS 2200S, sourced from Adeka, as a phosphate based flame retardant; Martinal ON 313, sourced from Huber Martinswerke, as an aluminum trihydrate filler; and Martinal ON 107 LEO, sourced from Huber Martinswerke, as an aluminum trihydrate with processing aid.

Example 1—Preparation of Samples 1-12

Samples 1, 2, 3, 4, 5, 6, 7, 8, 9, 10, 11, and 12 were prepared as follows.

First, masterbatches of polymer carrier and fillers were pre-compounded to produce Compounds A, B, C, D, E, F, and G. Compounds A-G were prepared using the materials in the amounts described in Table 2.

TABLE 2

Formulations of Pre-batch Sample Compounds A-G [wt. %]

| Compound | A | B | C | D | E | F | G |
|---|---|---|---|---|---|---|---|
| ELVAX ™ 210W | 25 | 26.1 | | | 26.7 | 14.6 | |
| AFFINITY ™ GA 1000R | | | 25 | 20 | 2.5 | 14.6 | |
| FUSABOND ™ P353 | | | | | | | 29.2 |
| Sidistar T120 U | 5 | | | 5 | 2.5 | 2.5 | 2.5 |
| Imerys MW-100 | 70 | | | | | | |
| Imerys 15 | | — | | 75 | | | |
| Omyacarb 10-AV | | | | | 68.3 | 68.3 | |
| Omyamaxx | | 73.9 | 75 | | | | 68.3 |

The materials were combined in the amounts shown in Table 2 to produce pre-batch Sample Compounds A-G using a Buss PR 46 co-kneader with the processing conditions provided subsequently in Table 3.

TABLE 3

Processing conditions for the Buss-compounding of the pre-batches.

| | units | |
|---|---|---|
| Barrel Temperature | ° C. | 110 |
| Die Temperature | ° C. | 100 |
| Screw Speed | rpm | 250 |
| Throughput | kg/h | 20 |
| Melt temperature | ° C. | 181 |
| Die Pressure | bar | 21 |
| Kneader power | kW | 2.9 |

The pre-batch Sample Compounds A-G from step 1 were then direct extruded on a 25 mm, 42 L/D co-rotating twin-screw extruder. Additional filler was side fed to the molten pre-batch Sample Compounds A-G from compounding step 1 to increase the filler content according to the amounts provided subsequently in Table 4. Table 5 lists the final formulations of Samples 1-14, which were utilized as extrudable core layers.

TABLE 4

Formulations of the blends used to extrude core sheets [wt. %]

| Sample # | 1 | 2 | 3 | 4 | 5 | 6 | 7 | 8 | 9 | 10 | 11 | 12 |
|---|---|---|---|---|---|---|---|---|---|---|---|---|
| Compound A | 38 | 49.4 | | | | | | | | | | |
| Compound B | | | 50 | 50 | 25 | | | | | | | |
| Compound C | | | | | 25 | | 50 | 49.3 | | | | |
| Compound D | | | | | | 50 | | | | | | |
| Compound E | | | | | | | | | 52 | 62.5 | | |
| Compound F | | | | | | | | | | | 46.4 | 36.4 |
| Compound G | | | | | | | | | | | | 10 |
| AFFINITY ™ GA 1000R | 2 | 0.6 | | | | | | | | | | |
| Omyamaxx | 60 | 50 | 50 | | | 40 | | | 19 | 18.1 | 19 | |
| Imerys 15 | | | | 30 | 30 | | 30 | 30 | | | | |
| Omyacarb 10-AV | | | | | | | | | 28.3 | | 33.9 | 26.4 |
| Martinal ON 313 | | | | 20 | 20 | | | | | | | |
| Hidromag Q3005 | | | | 20 | 20 | | | | | 18.1 | | 26.5 |
| Flamestab FS 2200S | | | | | | 10 | | | | | | |
| Kenreact LICA 38 | | | | | | | | 0.7 | | | | |
| Sidistar T120U | | | | | | | | | 0.7 | 1.3 | 0.7 | 0.7 |
| Total | 100 | 100 | 100 | 100 | 100 | 100 | 100 | 100 | 100 | 100 | 100 | 100 |

TABLE 5

Formulations for direct extrusion of core layers utilizing Samples 1-12

| Sample # | 1 | 2 | 3 | 4 | 5 | 6 | 7 | 8 | 9 | 10 | 11 | 12 |
|---|---|---|---|---|---|---|---|---|---|---|---|---|
| ELVAX ™ 210W | 9.5 | 12.4 | 13.1 | 13.1 | 6.5 | | | | 13.9 | 16.7 | 6.8 | 5.3 |
| AFFINITY ™ GA 1000R | 2.0 | 0.6 | | | 6.3 | 10.0 | 12.5 | 12.3 | 1.3 | 1.6 | 6.8 | 5.3 |
| FUSABOND ™ P353 | | | | | | | | | | | | 2.9 |
| Sidistar T120 U | 1.9 | 2.5 | | | 2.5 | | | | 2.0 | 2.9 | 1.9 | 1.9 |
| Flamestab FS 2200S | | | | | | 10.0 | | | | | | |
| Imerys MW-100 | 26.6 | 34.6 | | | | | | | | | | |
| Omyacarb 10-AV | | | | | | | | | 63.8 | 42.7 | 65.6 | 51.2 |
| Omyamaxx | 60.0 | 50.0 | 87.0 | 37.0 | 37.2 | 40.0 | 37.5 | 37.0 | 19.0 | 18.1 | 19.0 | 6.8 |
| Imerys 15 | | | | 30.0 | 30.0 | | 37.5 | 30.0 | 30,0 | | | |
| Martinal ON 313 | | | | 20.0 | 20.0 | | | | | | | |

TABLE 5-continued

Formulations for direct extrusion of core layers utilizing Samples 1-12

| Sample # | 1 | 2 | 3 | 4 | 5 | 6 | 7 | 8 | 9 | 10 | 11 | 12 |
|---|---|---|---|---|---|---|---|---|---|---|---|---|
| Hidromag Q3005 | | | | | | | 20.0 | 20.0 | | 18.1 | | 26.5 |
| Kenreact LICA 38 | | | | | | | | 0.7 | | | | |
| Filler Total | 86.6 | 84.6 | 87.0 | 87.0 | 87.2 | 77.5 | 87.5 | 87.7 | 82.8 | 78.9 | 84.6 | 84.5 |
| Total | 100 | 100 | 100 | 100 | 100 | 100 | 100 | 100 | 100 | 100 | 100 | 100 |

As shown in Tables 2, 4, and 5, Sample 1 included a blend of ethylene-vinyl acetate copolymer and maleic anhydride-grafted polyethylene with 86.6 wt. % fillers; Sample 2 included a blend of ethylene-vinyl acetate copolymer and maleic anhydride-grafted polyethylene with 84.6 wt. % fillers; Sample 3 included only ethylene-vinyl acetate copolymer with 87 wt. % fillers; Sample 4 included only ethylene-vinyl acetate copolymer with 87 wt. % fillers; Sample 5 included a blend of ethylene-vinyl acetate copolymer and maleic anhydride-grafted polyethylene with 87 wt. % fillers; Sample 7 included only maleic anhydride-grafted polyethylene with 87.5 wt. % of fillers; Sample 8 included only maleic anhydride-grafted polyethylene a with 87.7 wt. % of fillers; Sample 11 included a blend of ethylene-vinyl acetate copolymer and maleic anhydride-grafted polyethylene with greater than 84.6 wt. % fillers; and Sample 12 included a blend of ethylene-vinyl acetate copolymer, maleic anhydride-grafted polyethylene, and maleic anhydride-grafted polypropylene with 84.5 wt. % fillers.

Comparative Sample 6 included only maleic anhydride-grafted polyethylene with 77.5 wt. % of fillers; Comparative Sample 9 included a blend of ethylene-vinyl acetate copolymer and maleic anhydride-grafted polyethylene with 82.8 wt. % of fillers; and Comparative Sample 10 included a blend of ethylene-vinyl acetate copolymer and maleic anhydride-grafted polyethylene with 78.9 wt. % fillers.

The final Samples 1-12 were extruded on a 25 mm co-rotating twin-screw extruder through a 300 mm flat slit die and fed into a three roll calendaring device, thereby shaping into a 1 mm thick core layer sample sheet. Table 6 lists the processing conditions for the direct extrusion of the final formulations listed in Table 5.

TABLE 6

Extrusion conditions of the sheet line used to fabricate core sheets.

| | Sheet No. | 1 | 2 | 3 | 4 | 5 | 6 | 7 | 8 | 9 | 10 | 11 | 12 |
|---|---|---|---|---|---|---|---|---|---|---|---|---|---|
| Extruder | | | | | | | | | | | | | |
| Throughput | [kg/h] | 14 | 7 | 6 | 10 | 8 | 8 | 10 | 10 | 12 | 12 | 10 | 10 |
| Screw Speed | [rpm] | 200 | 370 | 370 | 350 | 320 | 320 | 240 | 240 | 200 | 240 | 200 | 240 |
| Barrel Zone 1 | [° C.] | 40 | 40 | 40 | 40 | 40 | 40 | 40 | 40 | 40 | 40 | 40 | 40 |
| Barrel Zone 2 | [° C.] | 160 | 170 | 140 | 170 | 170 | 170 | 200 | 200 | 170 | 160 | 200 | 210 |
| Barrel Zone 3 | [° C.] | 160 | 170 | 140 | 170 | 170 | 170 | 200 | 200 | 170 | 160 | 200 | 210 |
| Barrel Zone 4 | [° C.] | 160 | 170 | 140 | 170 | 170 | 170 | 200 | 200 | 170 | 160 | 200 | 210 |
| Barrel Zone 5 | [° C.] | 160 | 170 | 140 | 170 | 170 | 170 | 200 | 200 | 170 | 160 | 200 | 210 |
| Barrel Zone 6 | [° C.] | 160 | 170 | 140 | 170 | 170 | 170 | 200 | 200 | 170 | 160 | 200 | 210 |
| Barrel Zone 7 | [° C.] | 160 | 170 | 140 | 170 | 170 | 170 | 200 | 200 | 170 | 160 | 200 | 210 |
| Barrel Zone 8 | [° C.] | 160 | 170 | 140 | 170 | 170 | 170 | 200 | 200 | 170 | 160 | 200 | 210 |
| Adapter | [° C.] | 180 | 180 | 140 | 180 | 180 | 180 | 200 | 200 | 180 | 180 | 200 | 210 |
| Die | | | | | | | | | | | | | |
| Left Zone | [° C.] | 180 | 180 | 160 | 180 | 180 | 180 | 210 | 210 | 180 | 180 | 210 | 210 |
| Middle Zone | [° C.] | 180 | 180 | 160 | 180 | 180 | 180 | 210 | 210 | 180 | 180 | 210 | 210 |
| Right Zone | [° C.] | 180 | 180 | 160 | 180 | 180 | 180 | 210 | 210 | 180 | 180 | 210 | 210 |
| Die Gap | [mm] | 1.2 | 1.3 | 1.4 | 1.3 | 1.3 | 1.2 | 1.3 | 1.3 | 1.2 | 1.3 | 1.2 | 1.3 |
| Calander | | | | | | | | | | | | | |
| Calander Gap 1 | [mm] | 1.0 | 1.0 | 1.0 | 1.0 | 1.0 | 1.0 | 1.2 | 1.2 | 1.0 | 1.0 | 1.2 | 1.2 |
| Roll Temp 1 | [° C.] | 30 | 30 | 30 | 30 | 30 | 30 | 60 | 60 | 30 | 30 | 60 | 60 |
| Roll Temp 2 | [° C.] | 40 | 40 | 40 | 40 | 40 | 40 | 60 | 60 | 40 | 40 | 60 | 60 |

TABLE 6-continued

Extrusion conditions of the sheet line used to fabricate core sheets.

| Sheet No. | | 1 | 2 | 3 | 4 | 5 | 6 | 7 | 8 | 9 | 10 | 11 | 12 |
|---|---|---|---|---|---|---|---|---|---|---|---|---|---|
| Roll Temp 3 | [° C.] | 20 | 20 | 20 | 20 | 20 | 20 | 20 | 20 | 20 | 20 | 20 | 20 |
| Take off | [m/min] | 3.9 | 1.9 | 1.8 | 2.8 | 2.4 | 2.4 | 3.0 | 2.8 | 3.3 | 3.6 | 2.8 | 3.0 |
| Sheet Thickness | [mm] | 1.2 | 1.2 | 1.1 | 1.2 | 1.1 | 1.1 | 1.1 | 1.2 | 1.2 | 1.1 | 1.2 | 1.1 |

Example 2—TGA Analysis to Determine Achieved Filler Level

A thermogravimetric analysis (TGA) of the samples was performed according to ASTM E1131 to verify the final inorganic filler content of Sample Sheets 1-3, 9, and 10. Based on the TGA results, Sample Sheets 1-3 contained a filler load of 83 wt. % or higher, and Sheets 9 and 10 had a filler load of less than 83 wt. %. These results are provided subsequently in Table 7.

TABLE 7

TGA of filler levels of Sample Sheets 1-3, 9, and 10.

| Sample | Filler load (wt. %) |
|---|---|
| Sample Sheet 1 | 85 wt. % |
| Sample Sheet 2 | 83 wt. % |
| Sample Sheet 3 | 87 wt. % |
| Comparative Sample Sheet 9 | 81 wt. % |
| Comparative Sample Sheet 10 | 80 wt. % |

Example 3: Gross Calorific Potential Test—EN ISO 1716

Sample Sheets 2, 3, 9 and 10 were evaluated according to EN ISO 1716. L. To evaluate the samples, three tests were run for each Sample, and the average of the three tests are reported in Table 8.

TABLE 8

PCS Analysis of Sample Sheets 2, 3, 9, and 10.

| Sample | Filler load (wt. %) | PCS [MJ/kg] |
|---|---|---|
| Sample Sheet 2 | 83 wt. % | 2.81 |
| Sample Sheet 3 | 87 wt. % | 2.51 |
| Comparative Sample Sheet 9 | 81 wt. % | 4.5 => 3 (fail) |
| Comparative Sample Sheet 10 | 80 wt. % | 6.6 => 3 (fail) |

As shown in Table 8, the results indicated a low Gross Calorific Value of 2.81 for Sample 2 (83% filler load) and 2.51 MJ/kg for Sample 3 (87% filler load), both of which passed the Euroclass A2 fire rating requirement with a requirement of less than 3 MJ/kg. Comparative Sample Sheets 9 and 10, which each had an inorganic filler load of less than 83 wt. % (81 wt. % and 80 wt. %, respectively) had a Gross Calorific Value of less than 3 MJ/kg and would not pass the Euroclass A2 fire rating requirement.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A halogen-free flame retardant composition comprising:
one or more polyolefin copolymers having a melt flow index of 350 grams per 10 minutes (g/10 min) to 1000 g/10 min measured at 190° C. and 2.16 kg, wherein the one or more polyolefin copolymers comprise a maleic anhydride-grafted polyolefin or a maleic anhydride-grafted polyolefin and an ethylene-vinyl acetate copolymer; and
at least 83 wt % inorganic fillers based on a total weight of the halogen-free flame retardant composition;
wherein the inorganic fillers comprise $CaCO_3$.

2. The halogen-free flame retardant composition of claim 1, wherein the halogen-free flame retardant composition comprises less than 17 wt % of the one or more polyolefin copolymers.

3. The halogen-free flame retardant composition of claim 1, wherein the halogen-free flame retardant composition comprises at least 85 wt % inorganic fillers based on the total weight of the halogen-free flame retardant composition.

4. The halogen-free flame retardant composition of claim 1, wherein the one or more ethylene copolymers comprises the maleic anhydride-grafted polyolefin and the ethylene-vinyl acetate copolymer.

5. The halogen-free flame retardant composition of claim 1, wherein the halogen-free flame retardant composition has a fuel load of less than 3 MJ/kg when measured according to EN ISO 1716.

6. The halogen-free flame retardant composition of claim 1, wherein the halogen-free flame retardant composition has a temperature rise of a furnace of less than or equal to about 50° C., a mass loss of a specimen of less than or about equal to 50%, and a time of sustained flaming of the specimen of about 20 seconds when measured according to EN ISO 1182.

7. The halogen-free flame retardant composition of claim 1, further comprising an internal inorganic lubricant.

8. The halogen-free flame retardant composition of claim 1, wherein the maleic anhydride-grafted polyolefin is a maleic anhydride-grafted polyolefin elastomer having a Brookfield viscosity greater than 8,000 cP when measured at 177° C.

9. The halogen-free flame retardant composition of claim 1, wherein the halogen-free flame retardant composition comprises at least 35 wt % of the $CaCO_3$ based on the total weight of the halogen-free flame retardant composition.

10. The halogen-free flame retardant composition of claim 1, wherein the inorganic fillers further comprise at least one compound selected from the group consisting of $BaSO_4$, $CaSO_4$, silicates, talc, kaolin clay, mica, aluminum trihydrate, aluminum oxide, magnesium hydroxide, huntites, boehmites, and combinations thereof.

11. A composite panel comprising:
a first metal layer;
a second metal layer;
a core layer disposed between the first metal layer and the second metal layer,
a first tie layer disposed between the first metal layer and the core layer; and
a second tie layer disposed between the second metal layer and the core layer; and
wherein the core layer comprises the halogen-free flame retardant composition of claim 1.

12. The composite panel of claim 11, wherein the first metal layer, the second metal layer, or both comprise aluminum.

13. The composite panel of claim 11, wherein the core layer has a thickness of 1 mm to 5 mm.

14. The composite panel of claim 11, wherein the composite panel is Euroclass A2 fire rated.

15. A method of fabricating the composite panel of claim 11, the method comprising:
extruding the core layer;
applying the first and second tie layers onto opposite surfaces of the core layer; and
laminating the first and second metal layers onto the first and second tie layers,
respectively, in order to produce the composite panel.

16. The method of claim 15, wherein the first and second tie layers are applied via coextrusion or lamination.

* * * * *